United States Patent [19]

Carlson

[11] 4,110,943
[45] Sep. 5, 1978

[54] ANIMAL GUARD

[76] Inventor: Gaynor Carlson, 28 N. Second St., Atwood, Kans. 67730

[21] Appl. No.: 759,459

[22] Filed: Jan. 14, 1977

[51] Int. Cl.² .......................................... A01M 29/00
[52] U.S. Cl. ...................................... 52/101; 256/12
[58] Field of Search ............ 174/5 R, 38, 40 R, 45 R, 174/136, 139; 49/58, 59, 60; 52/40, 101, 147, 173 R; 119/1, 96; 256/1, 2, 3, 11, 12; 47/23, 24

[56] References Cited

U.S. PATENT DOCUMENTS 3,611,651  10/1971  Carlson .................................. 52/101

FOREIGN PATENT DOCUMENTS 54,235   11/1890  Fed. Rep. of Germany ............. 47/24
380,265   9/1923  Fed. Rep. of Germany ............. 256/12
176,058   7/1961  Sweden .................................. 174/45 R
612,265  11/1948  United Kingdom ..................... 256/12

*Primary Examiner*—Laramie E. Askin
*Attorney, Agent, or Firm*—Sheridan, Ross, Fields & McIntosh

[57] ABSTRACT

Animal guard assembly for attaching to a support member for an electrical pedestal or to the top of the pedestal for guarding against animals rubbing same, the device comprising an outer support assembly or guard member carrying animal repelling elements such as barbs, and an inner attachment assembly for securing the guard member to a post-like member. The guard member carrying the barbs is rotatable and removable from the inner attachment assembly so that it can be removed to permit access to the electrical pedestal.

15 Claims, 5 Drawing Figures

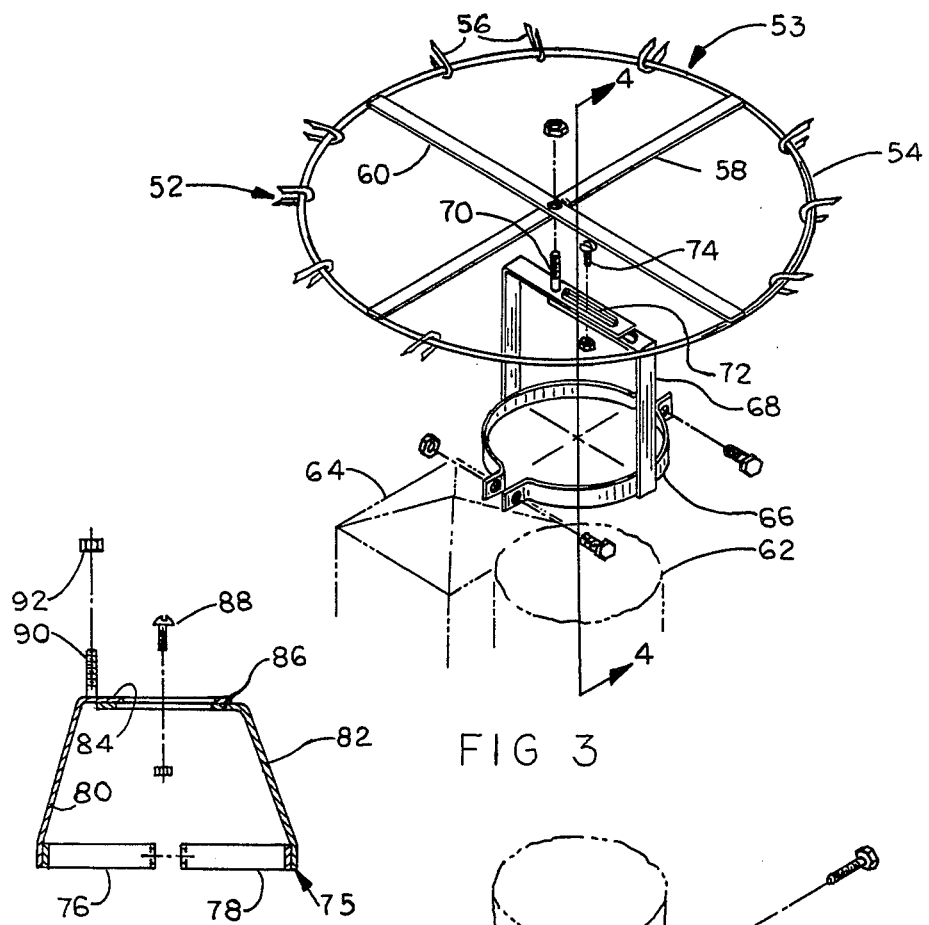
FIG 3
FIG 4
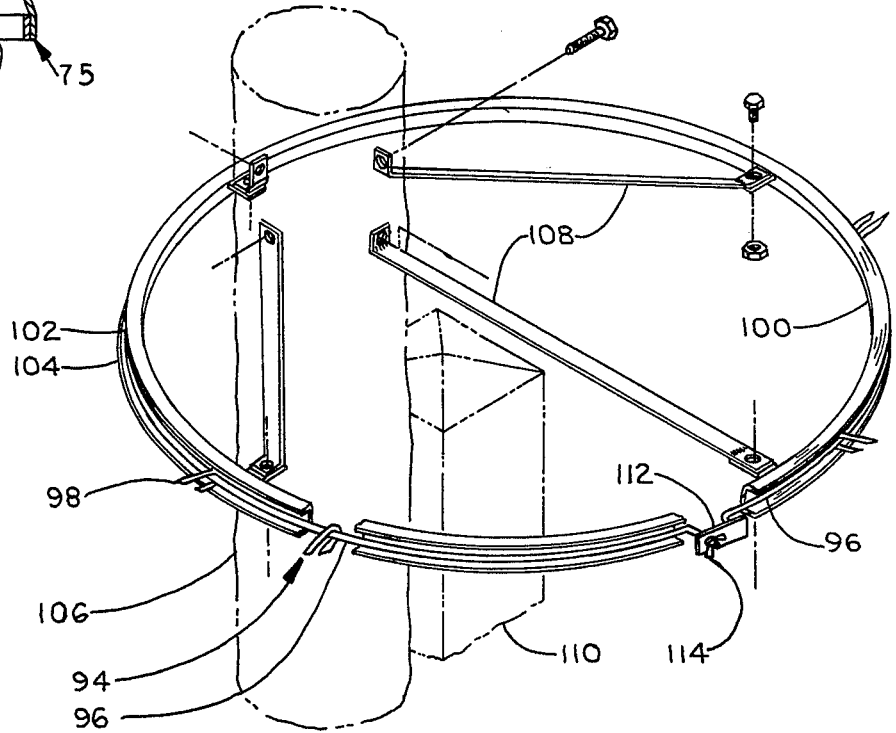
FIG 5

4,110,943

ANIMAL GUARD

BACKGROUND OF THE INVENTION

In the maintenance of underground telephone and other electrical transmission lines it is necessary to connect electrical test equipment and other type equipment into the lines at spaced intervals for various purposes, such as, locating a short, a damaged section, and for other purposes. "Pedestals" located approximately a mile apart and containing wire closures, relays, repeaters and other test elements are used in connection with this maintenance. The pedestals are stake or pole mounted. With the stake mounted type no pole is required although a stub pole is often set adjacent the stake for added support.

Pedestals for underground electrical transmission lines, which often pass through extensive ranching areas where animals such as cattle, sheep and pigs are present, must be protected from animals scratching or rubbing on them and damaging them. Devices for guarding against animals rubbing against various elements are disclosed in U.S. Pat. Nos. 1,923,858; 3,362,115; 3,400,503 and 3,611,651. A disadvantage of prior art guard devices for protecting electrical pedestals against animal contact is that the guard elements are not removable to permit access of workmen to the pedestal.

Accordingly, it is an object of this invention to provide an animal guard assembly for electrical pedestals mounted on support members which is an effective guard against animals rubbing or scratching against the pedestals and in which the guard member can be readily removed to permit access of workmen to the pedestal and replaced in operative arrangement after the work is finished.

BRIEF DESCRIPTION OF THE DRAWING

FIG. 3 is a partial perspective view of a third modification of the animal guard assembly of the invention mounted on a stub shaft to protect an electrical pedestal mounted thereon;

FIG. 4 is a cross sectional view of a modification of the inner attachment assembly of FIG. 3 for mounting the outer guard member to an electrical pedestal or to a support member for the pedestal, and FIG. 5 is a partial perspective view of a fourth modification of the animal guard assembly of the invention comprised of modified outer guard member and modified inner attachment assembly and showing the device mounted on a pole to protect a pole mounted electrical pedestal.

DESCRIPTION OF PREFERRED EMBODIMENT

Figure 1:
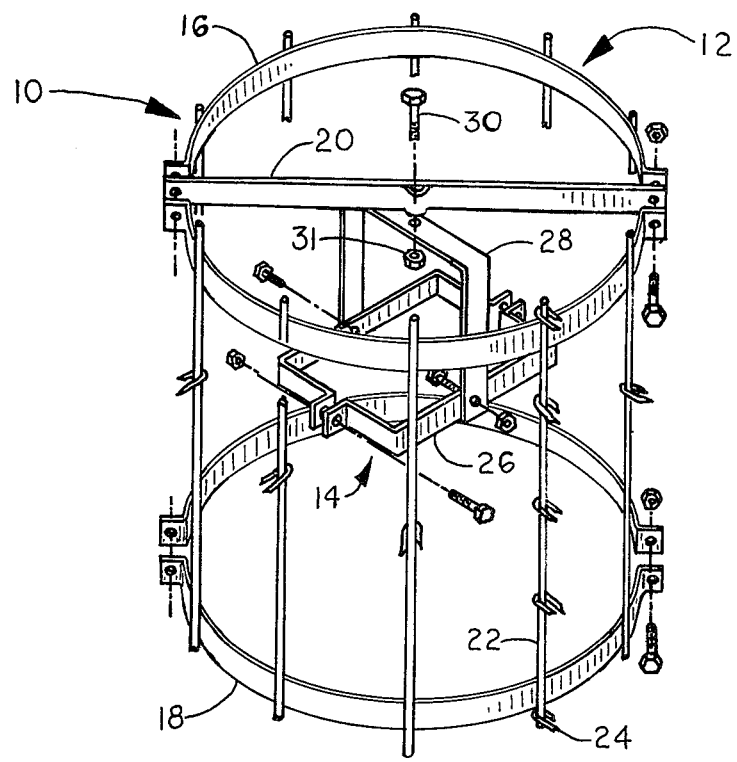
FIG. 1 is a partial perspective view of one modification of the animal guard assembly of the invention.

Referring to FIG. 1 of the drawings, the numeral 10 represents generally one modification of the animal guard assembly of the invention comprised of an outer removable cage-like guard element indicated generally at 12 and an inner attaching assembly designated generally at 14 to be mounted over the top of an electrical pedestal.

The guard element 12 is comprised of support members for the guard elements which in this modification are the upper circular band 16 and the lower circular band 18. These bands are shown in circular configuration, although they may be rectangular or take other configurations. The bands are constructed of semi-circular sections, secured together by mating flanges at their ends as shown. A brace 20 is secured between the mating end flanges of the two semi-circular halves of the upper band-like member 16.

The band-like members 16 and 18 are secured together by guard rods 22 welded near their ends to the outside of the bands 16 and 18, the rods being circumferentially spaced around the bands 16 and 18. The guard rods 22 support the animal repelling elements 24 which in this modification take the form of wire staples. The staples 24 are welded to the guard rods 22 by the inner surfaces of their bridges so that their pointed ends extend outwardly to protect against animals rubbing against the device. The animal repelling elements may take other forms, such as, single prongs, etc. Staples are used in this modification in the interest of safety to the animal as this type barb has been used for many years on barbed wire fences without significant injury to animals.

The inner attaching assembly 14 for securing the guard element 12 to the top of an electrical pedestal, and like object, is comprised of rectangular attachment bracket 26 constructed of two halves to be secured together by their flanged ends as shown, after the bracket is placed over the top of an electrical pedestal. This bracket can take other forms than rectangular and need not be closed, as it could be sectional with the sections themselves bolted or otherwise secured to the post-like object.

A U-shaped bracket or yoke 28 for securing the attachment bracket 26 to cage-like guard element 12 through brace 20 is secured by means of its legs centrally to the attachment bracket 26 by bolts as shown or by other means. Attachment means in the form of a bolt 30 inserted downwardly through brace 20 is provided for rotatably and removably attaching the U-shaped bracket 28 to the brace 20 by means of self locking nut 31. It will be noted that in this modification the method of attachment of the U-shaped bracket 28 to the brace 20 provides for rotation of the cage-like guard element 12 which supports the animal repelling elements around the inner mounting structure 14. It is also to be noted that this method of attachment provides for easy removal of the cage-like guard element 12 from the inner attachment assembly 14 to permit workmen to work on the pedestal, to which the animal guard assembly is to be mounted.

Figure 2:
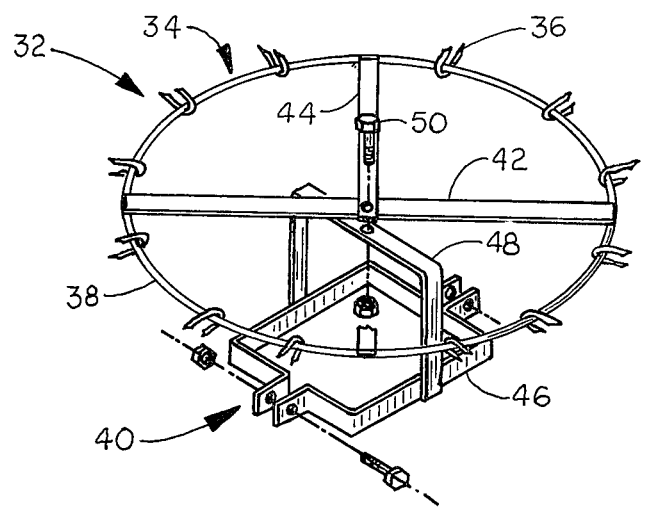
FIG. 2 is a partial perspective view of a second modification of the animal guard assembly of the invention for mounting on the top of a support member such as an electrical pedestal and showing a second modification of the outer guard member.

Reference is now made to FIG. 2 in which a second modification of the invention is shown and in which the guard assembly is indicated generally by the numeral 32. The guard element represented generally at 34 of this assembly is comprised of the support member for the animal repelling elements 36 in the form of a metal ring 38 and the inner attaching assembly represented generally by the numeral 40. The support member for the animal repelling elements takes the form of a metal ring in this modification, but it could be rectangular or of other configuration and could be of other cross section than circular. This ring 38 supports the barbs 36 in the form of staples which are welded to it so that their pointed ends protrude outwardly. Two braces 42 and 44 mounted perpendicular to each other and extending through the diameter of the ring are secured at their ends to the ring by welding or otherwise.

The inner attachment assembly 40 is identical in structure with that of FIG. 1 and is comprised of the rectangular attachment bracket 46 and the U-shaped bracket or yoke 48 of the same construction as that described for corresponding structure of FIG. 1. An attachment means such as the bolt 50 is provided for rotatably attaching the U-shaped bracket 48 to the braces 42 and 44 at their central intersection point in the same manner as described for corresponding structure in FIG. 1 so that the outer guard element 34 is easily removed from the yoke member 48 and so that the guard element 34 is rotatable about the U-shaped bracket 48.

Reference is now made to FIG. 3 for the description of a third modification of the invention. In this modification the guard assembly is represented generally by the numeral 52. The guard element represented generally at 53, comprised of metal support ring 54 supporting barb members 56 and provided with cross-braces 58 and 60, is essentially of the same construction as the guard element 34 of FIG. 2. The difference between this modification and that of FIG. 2 is in the structure of the inner mounting assembly for rotatably and removably mounting the guard element 53 to the top of a stub shaft 62 so that the guard element 53 extends over and protects an electrical pedestal 64 mounted on or adjacent the stub shaft.

The mounting assembly for this modification is comprised of a circular band 66 having flanged ends as in mounting bracket 46 of FIG. 2, for attachment by means of a bolt extending through the flanged ends, securely around the top end of stub shaft 62. For rotatably and removably securing the guard element 53 to attachment or mounting band 66, a connecting strip 68 having right angle bends is secured at its ends by welding or otherwise to mounting band 66, the strip being rotatably and removably secured to cross-braces 58 and 60 at their intersection by means of bolt 70 in the same manner in which guard element 34 of FIG. 2 is rotatably and removably secured to inner attachment or mounting assembly 40. From the described construction it is seen that the support element 53 is mounted so that it extends over electrical pedestal 64 to protect it. Connecting strip 68 is constructed to be adjustable for different diameter stub shafts 62 or other support members by making it in two sections with overlapping ends and providing the sections with slots 72 so that the sections can be adjustably secured together by means of a bolt 74 to provide different effective lengths for band 68.

Reference is now made to FIG. 4 for a description of a modified mounting assembly 75 for the guard element 53 of FIG. 3. The mounting band of the mounting assembly 75 is made of two sections 76 and 78 with flanged ends as shown having bolt holes for securing the sections around various diameter support members. Two connecting strips 80 and 82 are each secured by one end to opposite points on sections 76 and 78 and are each angled inward and provide horizontal end sections 84 and 86. The end sections 84 and 86 are provided with slots as shown so that the end sections may be adjustably secured together by means of bolt 88 to accommodate different diameter support means. For securing the guard element 53 to the mounting assembly 75, a bolt 90 is secured by one end to strip 80 or 82 and the guard element 53 is rotatably and removably secured to the other end of bolt 90 by means of self-locking nut 92 in the same manner as described for corresponding structure of FIGS. 1, 2 and 3. Bolt 90 is secured to strip 80 near the strip's outer extremity so that the guard element 53 is supported in a position to extend over and protect the pedestal 64.

Reference is now made to FIG. 5 for a description of another modification of the invention embodying a modification of both the guard element and the attaching or mounting means for the purpose of permitting the guard element to be mounted around a portion of a pole or other support member removed from its free end. The guard element 94, comprised of metal ring 96 bearing barb elements 98, is of similar construction as guard element 53 of FIG. 3. The guard element 94 is supported in the groove of inner support ring 100 formed by outwardly extending edges 102 and 104.

The support ring and guard element assembly is mounted on a post 106 by means of arms 108 attached by their bottom ends to support ring 100 and by their upper ends to post 106 as shown. The ring 96 is broken so that its ends can be spread to permit removal of the guard element from the support ring 100 to permit workmen to use the pedestal 110 and reassembled into the groove of support ring 100. Its ends are detachably secured together by any suitable means such as by link 112 secured to one bent end of ring 96, the link having a hole in its other end through which the other bent and threaded end of ring 96 is inserted and secured by nut 114. The support ring 100 can also be broken for spreading its ends to permit its installation around a standing pole with similar means being provided for detachably securing its ends together.

In the use of the animal guard assembly 10 of FIG. 1, the cage-like assembly 12 is ordinarily detached from the inner attachment assembly 14 and the inner attaching assembly placed over the top of the post-like member and secured thereto by securing the two halves of the attachment bracket 26 around the sides of the post-like member. The outer cage-like guard assembly 12 is then placed over the U-shaped bracket 28 and secured thereto by means of the bolt 30. When an animal attempts to contact the post-like member for rubbing or scratching, the animal will contact the barbs 24 and be discouraged from rubbing or scratching. The outer cage-like structure 12 bearing the barbs will rotate and minimize any danger of injury to the animal. When it becomes necessary for workmen to work around the electrical pedestal on which the device is mounted, the outer cage-like guard member 12 bearing the barbs can be readily removed by removal of the nut 31 thus permitting the cage-like member to be removed from the assembly.

The operation of the animal guard assembly of FIG. 2 is similar to that described for FIG. 1 in that the mounting assembly 40 is first attached to the pedestal by means of the attachment bracket 46 and yoke 48 to which the ring 38 is then secured by means of the bolt 50. The guard element 34 is then rotatable and can be easily removed by removal of the bolt to permit access to the pedestal on which the guard assembly is mounted.

As respects use of the modification of FIG. 3, the mounting band 66 is first securely bolted around the stub-shaft 62 and the bolt 74 made secure. The guard element 53 is then placed in position over strip 68 with bolt 70 protruding upwardly through the intersection of the braces 58, 60 and the self-locking nut applied. The guard element 53 is then rotatable to prevent the barbs injuring animals who may attempt to rub against it. It is also readily removable to permit access to pedestal 64 by workmen.

The mounting of the guard element 52 on a stub-shaft using the mounting assembly 75 of FIG. 4 is essentially the same as described for the modification of FIG. 3, bolt 88 being used to secure the ends of adjustable strips 80 and 82 and the guard element 53 being rotatably and removably attached by means of bolt 90 and self-locking nut 92.

In the use of the modification of FIG. 5 the grooved inner support ring 100 is placed around the pole or stub-shaft either over the top or by using the split version. The arms 108 are then secured to the stub-shaft or pole. The guard element 94 is rotatable within the groove and it can be readily removed after separating its ends to permit workmen to have access to the pedestal which it protects and reapplied after the work is finished.

It is to be understood that parts of the guard assembly of the invention may be made of metal, plastic or other suitable materials. The invention in its broadest form comprises a rotatable and removable guard element suppoting the animal repelling elements, and an attachment means for attaching the guard element to a stub-shaft or other support member supporting an electrical pedestal in position to protect the pedestal and the invention is not limited to the particular guard element and attachment means of the illustrative embodiments of the invention. The invention includes more than one support element for animal repelling elements mounted on a single attaching means. It also includes structure for protecting a post-like member or an electrical pedestal mounted or unmounted on a post-like support member.

What is claimed is:

1. An animal guard assembly for protecting an object such as a post-like member or an electrical pedestal unmounted or mounted on a post-like member against rubbing by an animal, comprising:
   (a) an upper band;
   (b) a lower band;
   (c) vertically aligned rods connecting said bands spaced circumferentially around said bands;
   (d) vertically spaced barbs mounted on said rods with their pointed ends protruding outwardly;
   (e) at least one brace extending across the center of said upper band having its ends secured to the band;
   (f) a band-like bracket adapted to fit over the top of said electrical pedestal or said post-like member for attachment thereto;
   (g) an upwardly extending U-shaped bracket attached to said band-like bracket, the upper part of said U-shaped bracket being a bridge; and
   (h) attachment means for attaching the bridge of said U-shaped bracket to said brace.

2. The animal guard assembly of claim 1 in which said attachment means comprises means for rotatably attaching the bridge of said U-shaped bracket to said brace.

3. The animal guard assembly of claim 1 in combination with said post-like member or said electrical pedestal.

4. An animal guard assembly for protecting an object such as a post-like member or an electrical pedestal unmounted or mounted on a post-like member against rubbing by an animal, comprising:
   (a) at least one ring-like member;
   (b) circumferentially spaced barbs mounted in conjunction with said ring-like member with their pointed ends protruding outwardly;
   (c) at least one brace extending across the center of said ring-like member having its ends secured to the member;
   (d) a band-like bracket adapted to fit over the top of said electrical pedestal or said post-like member for attachment thereto;
   (e) an upwardly extending U-shaped bracket attached to said band-like bracket, the upper part of said U-shaped bracket being a bridge; and
   (f) attachment means for attaching the bridge of said U-shaped bracket to said brace.

5. The animal guard assembly of claim 4 in which said attachment means comprises means for rotatably and removably attaching the bridge of said U-shaped bracket to said brace.

6. The animal guard assembly of claim 5 in combination with said post-like member or said electrical pedestal.

7. The animal guard assembly of claim 4 wherein the bridge of said U-shaped bracket includes adjustable length means whereby the U-shaped bracket attached to said band-like bracket can be adjusted to fit various sizes of electrical pedestals or post-like members.

8. An animal guard assembly for protecting an object such as a post-like member or an electrical pedestal unmounted or mounted on a post-like member against rubbing by an animal, comprising:
   (a) a band having an outwardly facing peripheral groove;
   (b) a ring mounted in said peripheral groove;
   (c) circumferentially spaced barbs mounted on said ring having their pointed ends protruding outwardly, and
   (d) attachment arms fixed at their bases to said band for attachment to said post-like member.

9. The animal guard assembly of claim 8 in which said ring is rotatably and removably mounted in said peripheral groove.

10. The animal guard assembly of claim 8 in combination with said post-like member or said electrical pedestal.

11. An animal guard assembly for protecting an object such as a post-like member or an electrical pedestal unmounted or mounted on a post-like member against rubbing by animals, comprising:
    (a) at least one support element for supporting animal repelling elements;
    (b) outwardly protruding animal repelling elements supported around the periphery of said support element; and
    (c) attachment means for attaching said support element to said electrical pedestal or to said post-like member;
    (d) said support element including a support ring provided with a peripheral outwardly-facing groove, and said repelling elements being mounted on a ring-like member rotatably and removably seated in said groove, said repelling elements being barb-like elements facing outwardly from said ring member.

12. The animal guard assembly of claim 11 in which said attachment means comprises a plurality of attachment arms fixed at their bases to said support ring and adapted to be attached to a post-like member.

13. An animal guard assembly for protecting an object such as a post-like member or an electrical pedestal unmounted or mounted on a post-like member against rubbing by animals, comprising:
(a) at least one support element for supporting animal repelling elements;
(b) outwardly protruding animal repelling elements supported around the periphery of said support element; and
(c) attachment means for attaching said support element to said electrical pedestal or to said post-like member;
(d) said attachment means comprising an attachment bracket for attachment over said electrical pedestal or post-like member, a U-shaped bracket mounted on said attachment bracket, and means for rotatably and removably attaching said support element to said U-shaped bracket.

14. The animal guard assembly of claim 13 in which said support element comprises at least upper and lower band-like support elements connected by rod-like members circumferentially spaced around the peripheries of said band-like support elements and bearing outwardly protruding barb-like members, a brace mounted centrally of said upper band-like support element to which the bridge of said U-shaped member is attached.

15. The animal guard assembly of claim 13 in which said support element is provided with internal intersecting cross-braces, and said support element is attached at the intersection point of said cross-braces to said attachment bracket at a point near the latter's periphery; whereby said support element will extend beyond said post-like member to protect an electrical pedestal mounted near said post-like support member.

* * * * *